No. 848,047. PATENTED MAR. 26, 1907.
H. E. PROCUNIER.
ELECTRIC CABLE SPLICING AND DISTRIBUTING BOX.
APPLICATION FILED FEB. 6, 1905.

Witnesses.
Edward T. Wray.
Fred'k G. Fischer.

Inventor.
Henry E. Procunier
by Burton & Burton
his Atty's.

UNITED STATES PATENT OFFICE.

HENRY E. PROCUNIER, OF OAK PARK, ILLINOIS.

ELECTRIC-CABLE SPLICING AND DISTRIBUTING BOX.

No. 848,047.   Specification of Letters Patent.   Patented March 26, 1907.

Application filed February 6, 1905. Serial No. 244,315.

*To all whom it may concern:*

Be it known that I, HENRY E. PROCUNIER, a citizen of the United States, residing at Oak Park, in the county of Cook and State of Illinois, have invented new and useful Improvements in Electric-Cable Splicing and Distributing Boxes, of which the following is a specification, reference being had to the accompanying drawings, forming a part thereof.

The purpose of this invention is to provide an improved junction splicing and distributing box for electric cables.

It consists of the features of construction set out in the claims.

Figure 1:
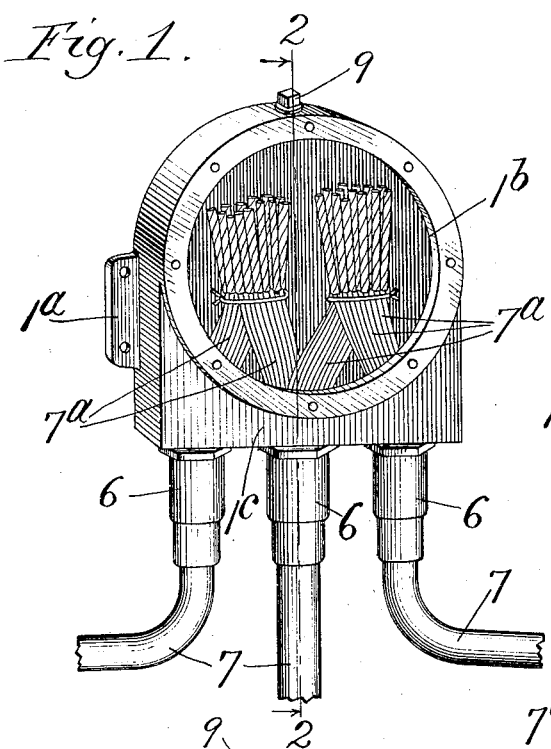
Figure 2:
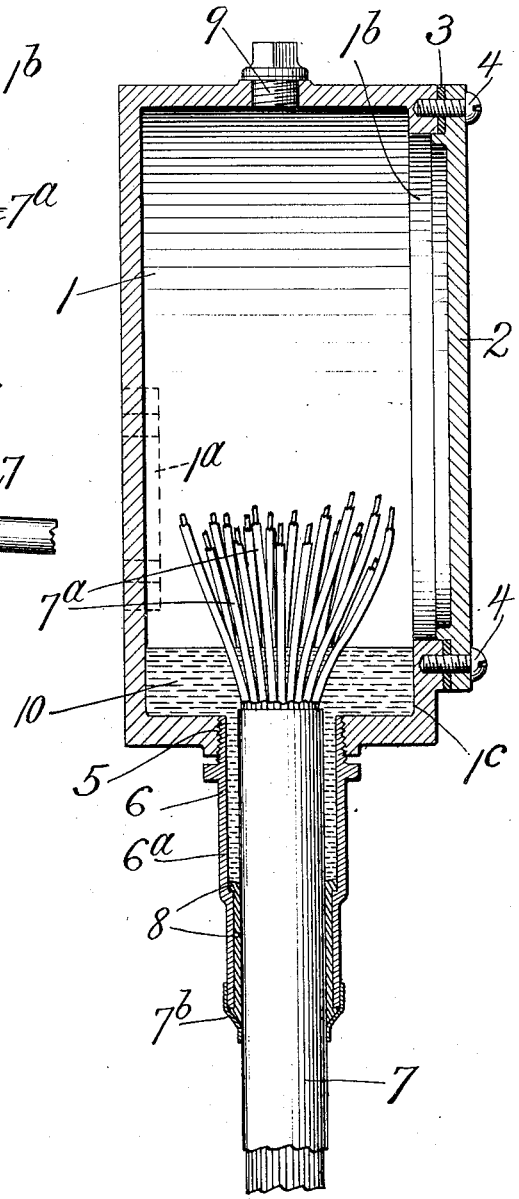
Figure 3:
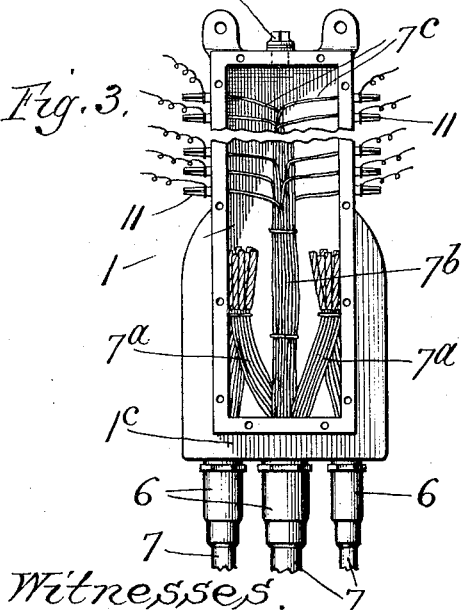

In the drawings, Figure 1 is a front elevation of my improved junction-box with the cover removed. Fig. 2 is a section at the line 2 2 on Fig. 1, showing the cover in place. Fig. 3 is a front elevation of a combined junction-box and terminal head embodying my invention with the front cover removed.

The specific purpose of the improvement which constitutes the present invention has relation to the necessity for excluding moisture from the cable, which is particularly necessary when the strands of the cable or the cable as a whole is paper-wrapped, because of the tendency of paper to absorb moisture and because of the fact that a very small amount of moisture in such paper covering will cause leakage from wire to wire in the cable, defeating perfect insulation, which is necessary to the complete independence of the currents carried by the several wires.

A secondary specific purpose of the invention is to produce a device in which cables may be subdivided or combined with the least inconvenience, and in which the connections may be inspected and the wires severally tested without breaking the connection as a whole.

For these purposes it comprises a box 1, preferably of cast-iron, made in a single piece except as to the cover and provided with lugs $1^a$ $1^a$, by which it may be attached to a post or other upright support, and having at the forward side an opening $1^b$, which affords opportunity for easy inspection of the entire interior of the box, the opening being relatively large. For this opening a cover 2 is provided, which is adapted to be bound tightly over the opening with intervening packing 3 to exclude the passage of air or moisture, bolts 4 4 4 being preferably employed to secure it in place. The lower side of the box has a plurality of threaded openings 5 5 5 for receiving threaded nipples 6 6 6, which may be screwed into the openings, and thereby made rigid with the box. These nipples are designed for the entrance and exit of the cables which are to be subdivided or combined within the box. Their construction in detail is set out in my application, Serial No. 166,515, filed in the Patent Office January 22, 1903, and now pending.

The structure of the nipple bears some relation to the present invention and may be briefly described. It is axially apertured to permit the free insertion of a cable 7 through it, and at the upper part it has an annular enlargement of the axial cavity $6^a$, in which there is lodged an annular deposit of solder 8. This enlargement extends far enough down so that the annular body of solder 8 is within a portion of the nipple which is exteriorly exposed when the nipple is screwed onto the bottom of the box, as shown, so that by applying heat, as from a blowpipe, to the outside of the nipple after it is in place and the cable has been inserted through it the solder may be caused to flow around the cable, and the lower end of the nipple being closed temporarily by any convenient means (illustrated as a temporary wrapping $7^b$) the solder may be held in the space at the lower end of the nipple, into which it will flow when melted until it becomes set therein, thus completely sealing the cable. It will be evident that any number of such nipples may be secured to a box of suitable size to have room in its lower side for such number and that a main cable entering through any one of these cables may be subdivided within the box, and branches may extend out through other nipples, or, conversely, two or more cables may be brought into the box through as many separate nipples and combined therein and passed out through another nipple, and two cables being brought in through the nipples may both be subdivided and different parts of each combined with different parts of the other to form new cables extending out from two or more other nipples, and that any desired number of wires may be distributed within the box and connected to terminals for running therefrom, and that in all these combinations and subdivisions each separate strand or wire of the cable can be inspected and tested at the splice or junction made in the box without interfering with the cable as a whole. The lower edge of the opening $1^b$ is sufficiently above the bottom of the box into which the nipples are screwed to leave a pocket-space 1° at the bottom of the box, through which all the strands or wires 7ª of the several cables extend upward to the junctions or splicings and into which the upper ends of the nipples may open. The purpose of this construction is to afford opportunity for sealing the cables at their entrance into the box through the nipples, so that no moisture can possibly pass from the box into the cables when the box is opened for any inspection or repairs, and for this purpose the pocket 1° at the bottom of the box is filled with paraffin or suitable sealing compound, which is melted and poured into the pocket and flows among the strands 7ª and also down into the nipples around the cables, filling all the crevices and cavities and covering the upper end of the nipples for the depth of the pocket—that is, to the lower edge of the opening 1ᵇ. At the upper side of the box there is made a vent-opening closed by a plug 9. After the nipples have been suitably connected in the box or after opening the box for inspection, the cover 2 being secured in place so as to make an air-tight joint by means of the packing 3, the plug 9 being removed or loosened, so as to permit the passage of air or vapor past it, the box may be heated by a blowpipe or other suitable means to a sufficient temperature to thoroughly dry all the cables and strands of cable in the box and the air therein, the moisture passing off through the vent-opening, and when this process has been continued for a few minutes, the plug being screwed down tight into the vent-aperture, the cooling of the box will produce a partial vacuum therein, and the substantial exhaustion of the moisture therefrom will cause the wires and cables to remain perfectly insulated by their coverings. As above indicated, this can be done easily each time the box is opened for inspection, and it will be observed that the fact that the solder which makes the joint between the cable-covering and the nipple is within the latter renders the nipple especially adapted for use in such situation, because no injury to the joint will result from melting the solder if this should happen in the heating of the box, for the purpose above explained, whereas if it were an exteriorly-soldered joint, and especially if it were elsewhere than at the bottom of the box, it would be liable to be injured by the complete or partial melting of the solder if the box should happen to become heated sufficiently or if the flame of the blowpipe should happen to be directed against it while heating the box. Being of the form shown, no injury results even if the solder should be melted.

In Fig. 3 I have shown this invention applied to a combined junction-box and terminal head—that is to say, a splicing and distributing box in which not only the entering cable is subdivided for splicing to form lesser cables running out from the box, but also a portion of the entering cable is subdivided into individual wires or strands 7°, which are connected to terminals 11 for individual wires running from the box. In this box all the features above described are present and indicated by the same letters as the corresponding features in the junction-box represented in the other figures.

I claim—

1. An electric-cable junction or splicing box having at the bottom a plurality of cable-entrances and a pocket into which said entrances lead, and through which the cables may extend upwardly to their junctions, said box having a lateral aperture opposite the cable-junctions whose lower margin constitutes the upper limit of the pocket; nipples connected to the box at the cable-entrances having each at the upper part an annular solder-cavity opening at the upper end into the pocket and extending below the bottom of the box within an exteriorly-exposed portion of the nipple, the cable being attached to the nipple by solder in said cavity.

2. An electric-cable-splicing box having at the bottom a pocket and a plurality of cable-entrances leading into the bottom of the pocket and through which cables may extend up into the pocket, said box having a lateral opening above the pocket through which the cables are accessible for splicing, and an air-tight closure for such lateral opening, the box having at the upper part a vent-aperture and a removable plug for closing the same.

In testimony whereof I have hereunto set my hand, in the presence of two witnesses, at Chicago, Illinois, this 16th day of January, A. D. 1905

HENRY E. PROCUNIER.

In presence of—
CHAS. S. BURTON,
FRED. G. FISCHER.